US010793266B2

(12) United States Patent
Scholl et al.

(10) Patent No.: US 10,793,266 B2
(45) Date of Patent: Oct. 6, 2020

(54) COMMERCIAL SUPERSONIC AIRCRAFT AND ASSOCIATED SYSTEMS AND METHODS

(71) Applicant: Boom Technology, Inc., Englewood, CO (US)

(72) Inventors: Nathaniel Blake Scholl, Englewood, CO (US); Joseph Ray Wilding, Englewood, CO (US); Joshua Krall, Englewood, CO (US); Andrew P. Berryann, Englewood, CO (US); Michael Reid, Englewood, CO (US)

(73) Assignee: BOOM TECHNOLOGY, INC., Englewood, CO (US)

( * ) Notice: Subject to any disclaimer, the term of this patent is extended or adjusted under 35 U.S.C. 154(b) by 0 days.

(21) Appl. No.: 15/811,327

(22) Filed: Nov. 13, 2017

(65) Prior Publication Data

US 2018/0134382 A1   May 17, 2018

Related U.S. Application Data

(60) Provisional application No. 62/421,870, filed on Nov. 14, 2016.

(51) Int. Cl.
*B64C 30/00* (2006.01)
*B64D 13/08* (2006.01)
(Continued)

(52) U.S. Cl.
CPC ............ *B64C 30/00* (2013.01); *B64C 1/1484* (2013.01); *B64D 11/064* (2014.12); *B64D 13/06* (2013.01); *B64D 13/08* (2013.01); *B64D 27/10* (2013.01); *B64D 27/18* (2013.01); *B64D 27/20* (2013.01); *B64D 33/02* (2013.01); *B64D 33/04* (2013.01); *B64D 43/00* (2013.01); *B64D 27/16* (2013.01);
(Continued)

(58) Field of Classification Search
None
See application file for complete search history.

(56) References Cited

U.S. PATENT DOCUMENTS 3,655,147 A   4/1972   Preuss
4,094,479 A   6/1978   Kennedy, Jr.
(Continued)

FOREIGN PATENT DOCUMENTS

DE   3014323   1/1982
EP   0732263   9/1996
(Continued)

OTHER PUBLICATIONS

International Search Report and Written Opinion for International Patent Application No. PCT/US2017/061390, Applicant: Boom Technology, Inc., dated Apr. 12, 2018, 11 pages.

*Primary Examiner* — Thomas G Black
*Assistant Examiner* — Demetra R Smith-Stewart
(74) *Attorney, Agent, or Firm* — Perkins Coie LLP

(57) ABSTRACT

Commercial supersonic aircraft and associated systems and methods. A representative commercial supersonic aircraft includes a fuselage configured to carry a crew and between 20 and 60 passengers, a delta wing mounted to the fuselage, and a propulsion system carried by at least one of the wing and the fuselage, the propulsion system including a plurality of engines, at least one variable-geometry inlet, and at least one variable-geometry nozzle.

21 Claims, 12 Drawing Sheets

(51) Int. Cl.
  *B64D 43/00* (2006.01)
  *B64D 11/06* (2006.01)
  *B64D 27/18* (2006.01)
  *B64C 1/14* (2006.01)
  *B64D 27/20* (2006.01)
  *B64D 13/06* (2006.01)
  *B64D 33/04* (2006.01)
  *B64D 33/02* (2006.01)
  *B64D 27/10* (2006.01)
  *B64D 27/16* (2006.01)

(52) U.S. Cl.
  CPC ........... *B64D 2013/0618* (2013.01); *B64D 2013/0625* (2013.01); *B64D 2013/0655* (2013.01); *B64D 2033/0286* (2013.01)

(56) References Cited

U.S. PATENT DOCUMENTS

| | | |
|---|---|---|
| 4,283,924 A | 8/1981 | Schütze |
| 7,770,377 B2 | 8/2010 | Rolt |
| 8,579,375 B2 | 11/2013 | Marais et al. |
| 8,887,485 B2 | 11/2014 | Ress |
| 9,536,435 B1* | 1/2017 | Shay ............... G08G 5/045 |
| 9,849,999 B1* | 12/2017 | Fymat ............. B64D 45/00 |
| 2002/0011071 A1 | 1/2002 | Needham |
| 2005/0098681 A1* | 5/2005 | Berson ............ B64C 30/00 244/1 N |
| 2009/0112535 A1* | 4/2009 | Phillips ........... G06Q 10/04 703/2 |
| 2013/0261914 A1* | 10/2013 | Ingram ............ B64C 39/024 701/70 |
| 2013/0341459 A1* | 12/2013 | Kosheleff ......... B64C 3/10 244/36 |
| 2015/0232204 A1* | 8/2015 | Alexander ....... B64C 15/00 244/171.1 |
| 2015/0268048 A1* | 9/2015 | Seastrand ........ G01C 21/20 701/528 |

FOREIGN PATENT DOCUMENTS

| | | |
|---|---|---|
| JP | 2004316431 | 11/2004 |
| WO | WO-2006086124 | 8/2006 |
| WO | WO-2014176622 | 11/2014 |
| WO | WO-2015175077 | 11/2015 |

* cited by examiner

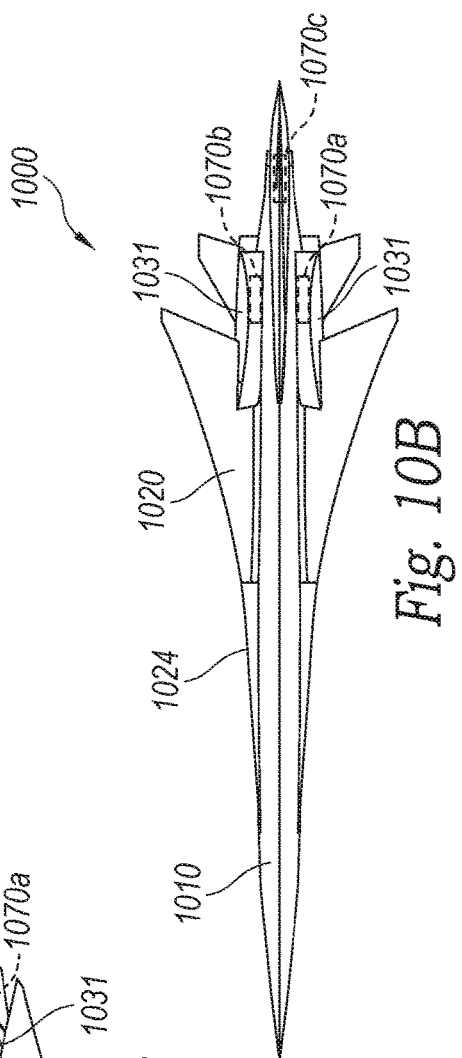
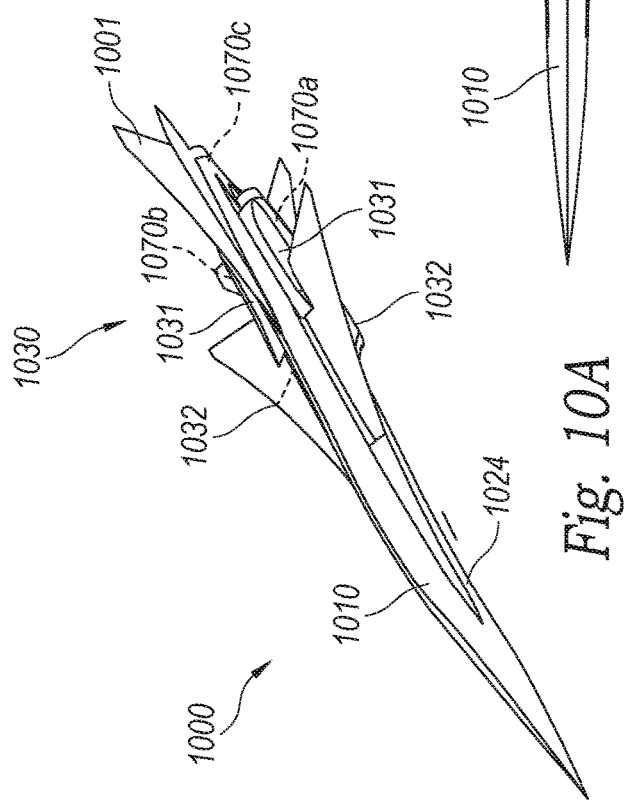
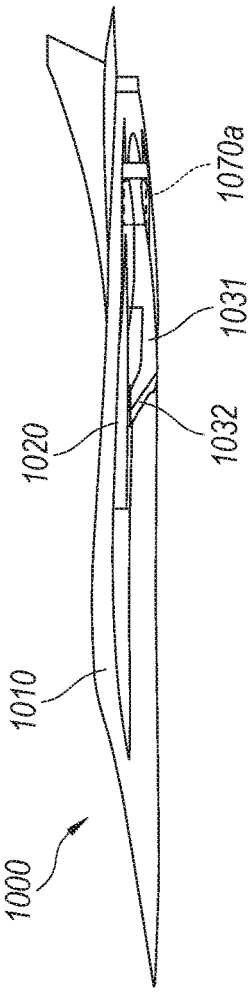
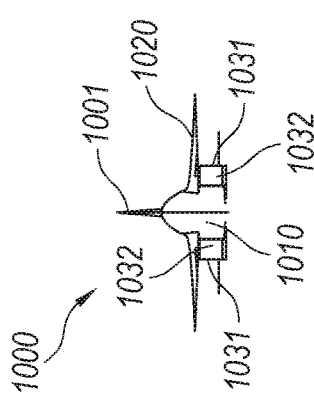

COMMERCIAL SUPERSONIC AIRCRAFT AND ASSOCIATED SYSTEMS AND METHODS

CROSS-REFERENCE TO RELATED APPLICATION

The present application claims priority to U.S. Provisional Application 62/421,870, filed Nov. 14, 2016 and incorporated herein by reference.

TECHNICAL FIELD

The present technology is directed generally to commercial supersonic aircraft, and associated systems and methods.

BACKGROUND

Supersonic aircraft have been used primarily for military missions since the mid-1900s. Then, in the 1970s, the United States and Europe each developed commercial supersonic aircraft: the supersonic transport, or "SST" in the United States, and the Concorde in Europe. The Concorde went on to fly commercial passengers on transatlantic routes through the 1990s. The fleet was permanently retired in 2003, following a temporary grounding in 2000 resulting from an accident. Despite the fact that the Concorde flew commercial passengers for several decades, it was not generally considered a commercially successful program because high operating costs did not make it broadly viable. Accordingly, and in light of the Concorde's retirement, there remains a need in the industry for a viable and profitable supersonic commercial aircraft.

BRIEF DESCRIPTION OF THE DRAWINGS

FIGS. 10A-10D illustrate a commercial supersonic aircraft configured in accordance with another embodiment of the present technology.

DETAILED DESCRIPTION

1.0 Overview

Figure 1:
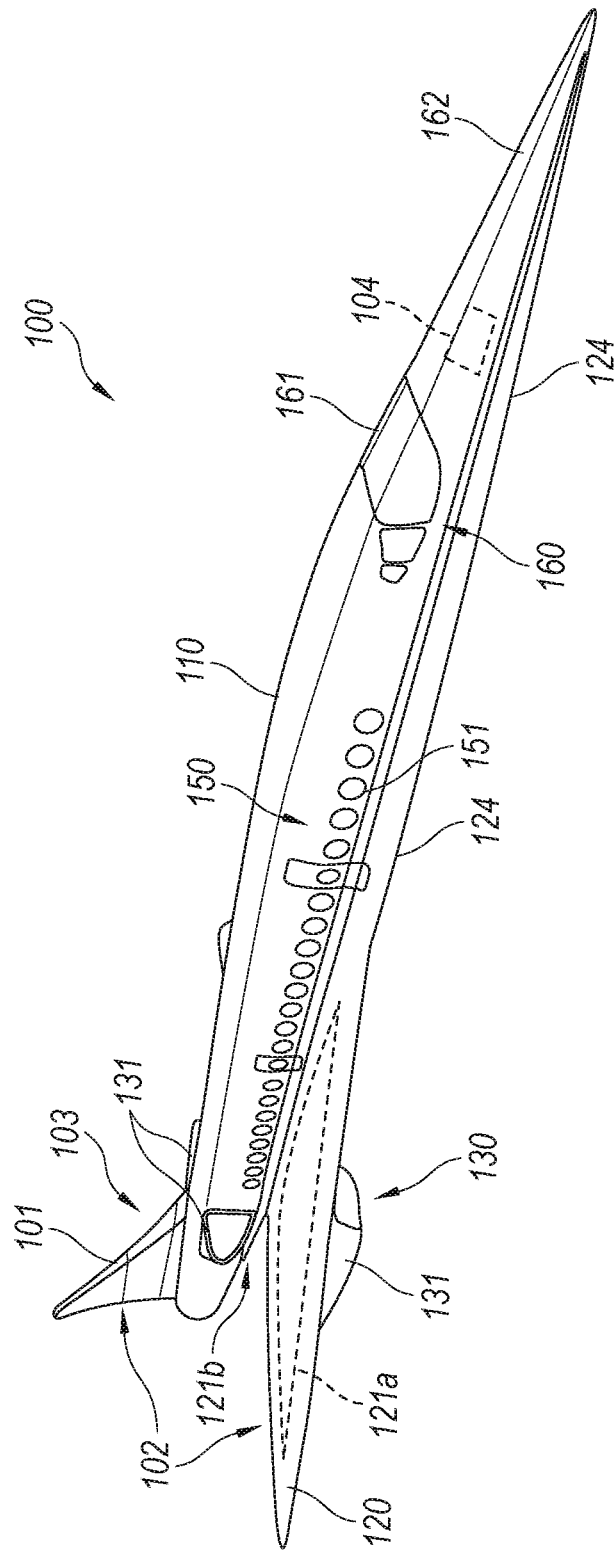
FIG. 1 is a partially schematic, isometric illustration of a commercial supersonic aircraft configured in accordance with embodiments of the present technology.

The present technology is generally directed to commercial supersonic aircraft, and associated systems and methods. In particular embodiments, the supersonic aircraft is configured to carry from 40-60, or from 45-55 passengers (a smaller number of passengers than did the Concorde) on transoceanic routes and/or overland routes. The size of the aircraft, alone or in combination with technological improvements in one or more of several areas described further below, are expected to provide a high speed option for commercial passengers, at a ticket price that is competitive with current and future business class ticket prices, even if fuel prices fluctuate.

Specific details of several embodiments of the technology are described below with reference to selected configurations to provide a thorough understanding of these embodiments, with the understanding that the technology may be practiced in the context of other embodiments. Several details describing structures or processes that are well-known and often associated with other types of supersonic aircraft and/or associated systems and components, but that may unnecessarily obscure some of the significant aspects of the present disclosure, are not set forth in the following description for purposes of clarity. Moreover, although the following disclosure sets forth several embodiments of different aspects of the technology, several other embodiments of the technology can have configurations and/or components that differ from those described in this section. As such, the technology may have other embodiments with additional elements and/or without several of the elements described below with reference to FIGS. 1-12.

Several embodiments of the technology described below may take the form of computer- or controller-executable instructions, including routines executed by a programmable computer or controller. Those skilled in the relevant art will appreciate that the technology can be practiced on computer or controller systems other than those shown and described below. The technology can be embodied in a special-purpose computer or data processor that is specifically programmed, configured or constructed to perform one or more of the computer-executable instructions described below. Accordingly, the terms "computer" and "controller" as generally used herein refer to any suitable data processor and can include, depending upon the task, palm-top computers, wearable computers, cellular or mobile phones, multi-processor systems, processor-based or programmable consumer electronics, network computers, minicomputers, and the like. Information handled by these computers can be presented at any suitable display medium, including a CRT display or LCD.

Aspects of the technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer disks, as well as distributed electronically over networks. Data structures and transmissions of data particular to aspects of the technology are also encompassed within the scope of the technology.

For purposes of organization, the following discussion is divided into different sections, each dealing with a major aircraft component or system. It will be understood that aspects of the technology described in the context of a particular system or subsystem may be combined with other technology aspects described in the context of other subsystems, in any of a variety of suitable manners.

2.0 Overall Vehicle Configuration

FIG. 1 is a partially schematic, isometric illustration of a supersonic commercial aircraft 100 configured in accordance with an embodiment of the present technology. The aircraft 100 includes a fuselage 110, which houses a passenger cabin 150 and flight deck 160. In a particular embodiment, the cabin 150 can be configured to carry about 45 revenue-generating passengers. More generally, the cabin 150 can have a maximum capacity of from 40-60 passengers, or 45-55 passengers. The foregoing ranges refer to upright passenger seats. In other embodiments, the cabin 150 can include lay-flat seats and/or upright seats. For example, the cabin 150 can include 20 lay-flat seats in an all-business class, low density configuration. In other embodiments, the cabin 150 can include a mix of lay-flat seats (e.g., less than 20) and upright seats. This capacity is distinguished from a non-commercial supersonic aircraft (e.g., a military or training aircraft), and is roughly equivalent to the business class capacity of a typical transoceanic, subsonic commercial aircraft. As will be discussed in further detail below, the convenience of reduced travel time provided by the aircraft 100 is expected to more than offset the likely reduction in space available to each passenger within the cabin 150, when compared with business class seats. Accordingly, for at least this reason, it is expected that embodiments of the aircraft 100 can be profitable to operate by carrying passengers paying a ticket price competitive with that of a subsonic business class passenger seat.

The aircraft 100 can include a supersonic wing 120, for example, a highly-swept delta-wing configuration to provide suitable lift at supersonic cruise conditions, as well as subsonic takeoff and landing conditions. In a particular embodiment, the wing 120 has a shape that is the same as or generally similar to existing NACA airfoils. A vertical stabilizer 101 (e.g., carried by an empennage 103 of the aircraft 100), as well as suitable flight control surfaces 102 carried by the wing 120 and/or the vertical stabilizer 101, provide for aircraft stability and control. The aircraft 100 can further include a chine 124 that extends forward of the main portion of the wing 120, along the fuselage 110.

In addition, the fuel carried by the aircraft 100 can be shifted in flight to align the aircraft center of gravity with the aircraft center of pressure, as the center of pressure shifts, thus further increasing aircraft stability. For example, the wing 120 can house one or more wing-based fuel tanks 121a (shown schematically in dashed lines) that carry the bulk of the fuel used during a typical flight of the aircraft 100. The aircraft 100 can further include one or more additional fuel tanks 121b, for example, housed aft of the wing 120 in the fuselage 110 or the empennage 103. In particular embodiments, an overall control system 104 (represented schematically in FIG. 1) for the aircraft 100 can perform a wide variety of functions, including shifting fuel between the fuselage-mounted fuel tank 121b and the wing-mounted fuel tank 121a. This process can be scheduled to accommodate changes in the center of pressure encountered by the aircraft 120 during flight, e.g., as it transitions between supersonic and subsonic flight. In particular embodiments, the fuel management/fuel shifting process is automated, thus reducing crew workload and (alone or together with other automated flight procedures) eliminating the need for a flight engineer. In some embodiments, the crew can consist of two members at the flight deck 160, and four members in the cabin 150.

Aspects of the control system 104 operate automatically, autonomously, and/or under the direct control of pilots seated at the flight deck 160, which is positioned toward the nose 162 of the aircraft 100. The nose 162 has a sharp configuration, suitable for efficient cruise operation at supersonic speeds. A corresponding flight deck windshield 161 can be highly integrated into the sharp, conical contour of the nose 162. As will be described in further detail below, the flight deck 160 may be outfitted with synthetic vision systems to provide additional visibility to the pilots, particularly during takeoff, climb-out, and landing, when the angle of attack of the aircraft 100 may be sufficiently high to prevent or impede the pilots' normal visual access in the forward direction. Suitable synthetic vision systems can present camera-based images that, in particular embodiments are software-enhanced.

The aircraft 100 includes a propulsion system 130 configured to power the aircraft efficiently at supersonic speeds (e.g., in a range from Mach 1.6 to Mach 2.4, and in some embodiments, Mach 2.2) during cruise, while also providing reasonably efficient subsonic performance during takeoff, climb-out, descent, and landing. In a particular embodiment, the propulsion system 130 includes two wing-mounted nacelles 131, one of which is visible in FIG. 1 and each of which powers a corresponding wing-mounted engine, described further below. The propulsion system 130 can further include two fuselage-mounted nacelles 131, both of which supply air to a third engine carried in the aft portion of the fuselage 110 or the empennage 103. This three-engine configuration can be used to meet regulatory requirements for extended overseas flights, at least until the overall configuration accrues sufficient flight hours for extended twin engine operation. Further details a representative propulsion system are described below.

3.0 Propulsion System

Figure 2:
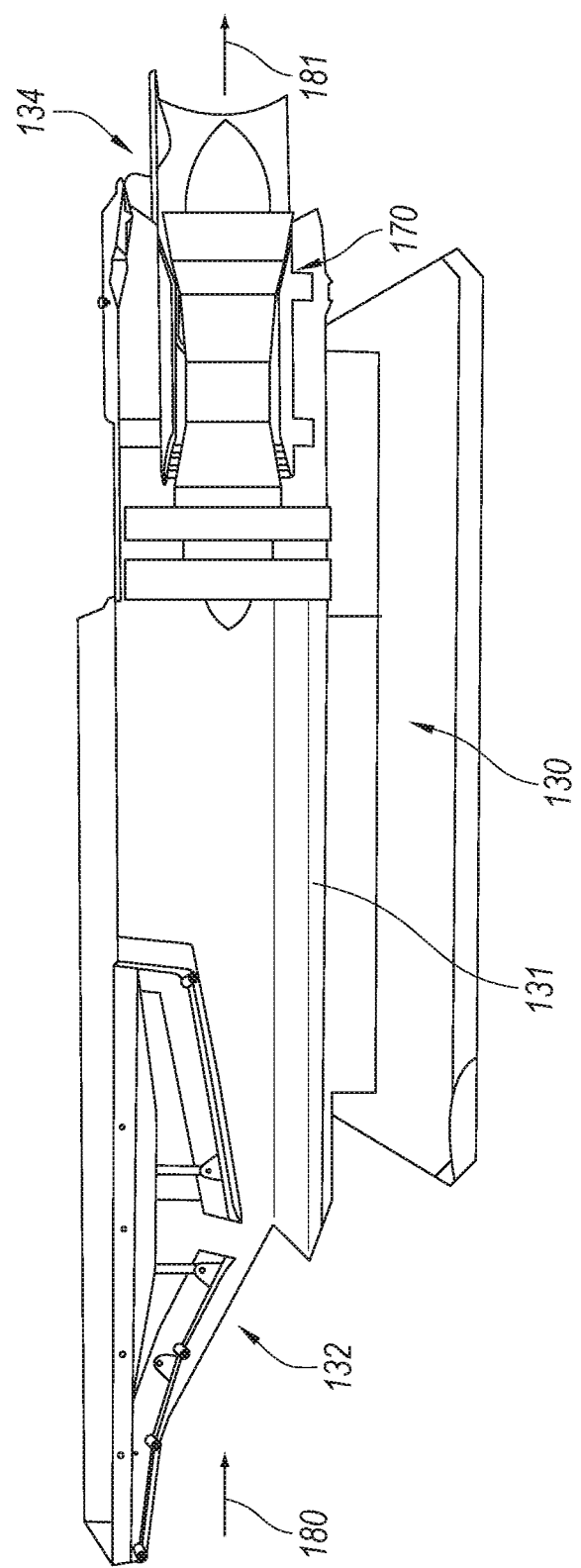
FIG. 2 is a partially schematic, cross-sectional illustration of a propulsion system suitable for use with the supersonic commercial aircraft shown in FIG. 1.

FIG. 2 is a partially schematic, cut-away side elevation view of a portion of the propulsion system 130, including a representative nacelle 131. The nacelle 131 houses a turbofan engine 170, an inlet 132 that provides inlet air 180 to the engine 170, and a nozzle 134 that directs exhaust products 181 aft from the engine 170. The engines 170 are configured to generate sufficient thrust to propel the aircraft 100, unlike other engines, (e.g., auxiliary power units) that may also be carried aboard the aircraft 100. As will be described in further detail below, both the inlet 132 and the nozzle 134 can include variable features (e.g., variable geometry features) to accommodate aircraft operation at a variety of subsonic and supersonic conditions.

Figure 3:
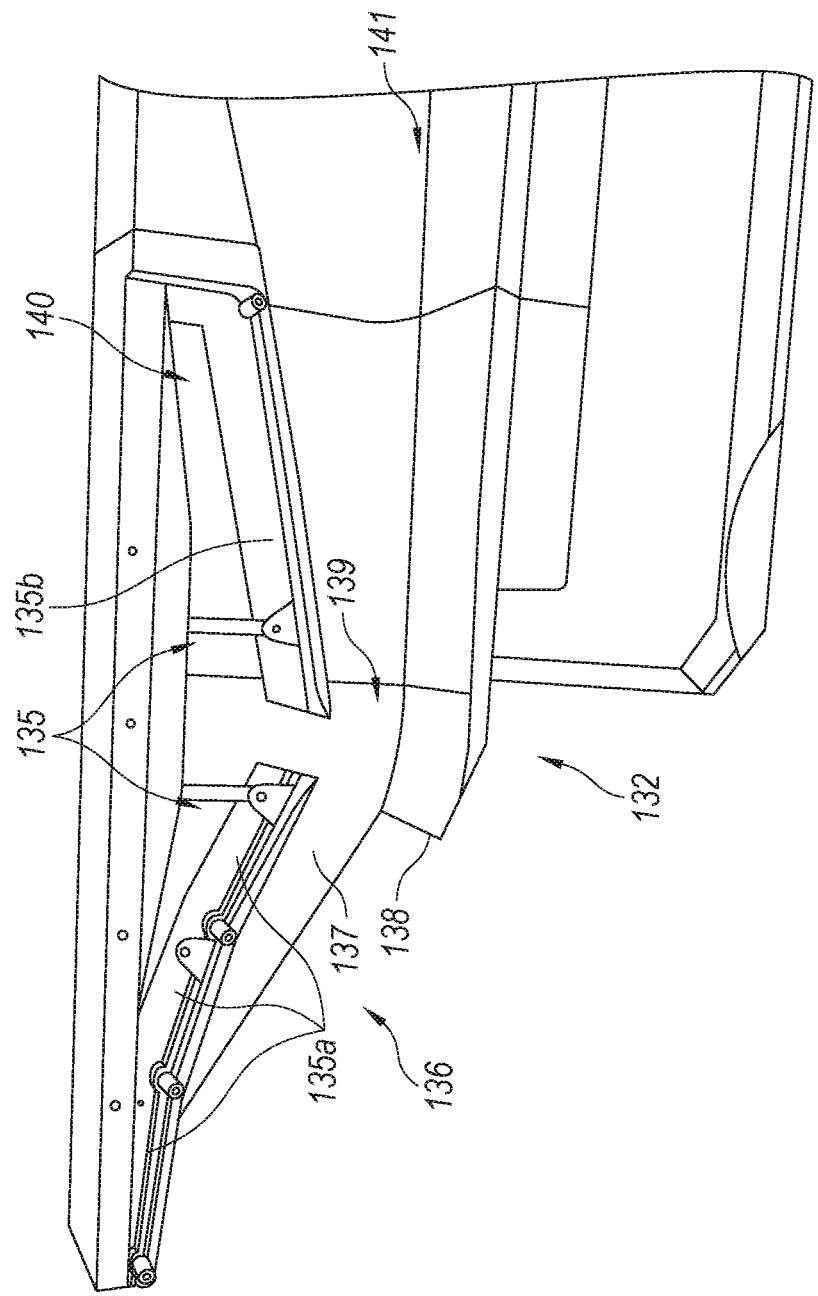
FIG. 3 is a partially schematic, cross-sectional illustration of an inlet portion of the propulsion system shown in FIG. 2.

FIG. 3 is an enlarged illustration of the inlet 132 shown in FIG. 2. As shown in FIG. 3, the inlet 132 has a generally two-dimensional geometry with an aperture 136, lip 138, and a generally rectangular cross-sectional flow area. The flow area through the inlet 132 is variable, and can be controlled by one or more moveable ramps 135, e.g., three forward ramps 135a and an aft ramp 135b. The ramps 135 control the compression performed on air entering the inlet 132 over a variety of flight conditions. During supersonic operation, the forward ramps 135a compress the flow through a series of oblique shocks, followed by a normal shock near a throat region 139 of the inlet 132. The initially supersonic flow entering the inlet 132 transitions to subsonic flow at the throat region 139 and further decreases in velocity (subsonically) through a diffuser 141, prior to entering the engine 170 (FIG. 2). The inlet 132 can include generally flat sidewalls 137, one of which is visible in FIG. 3, and can include a bypass duct 140 to control flow through the throat region 139, particularly during supersonic operation. During subsonic operation, both the forward ramps 135a and the aft ramp 135b can be fully opened to allow a sufficient flow of subsonic air into the diffuser 141 to the engine face.

Figure 4:
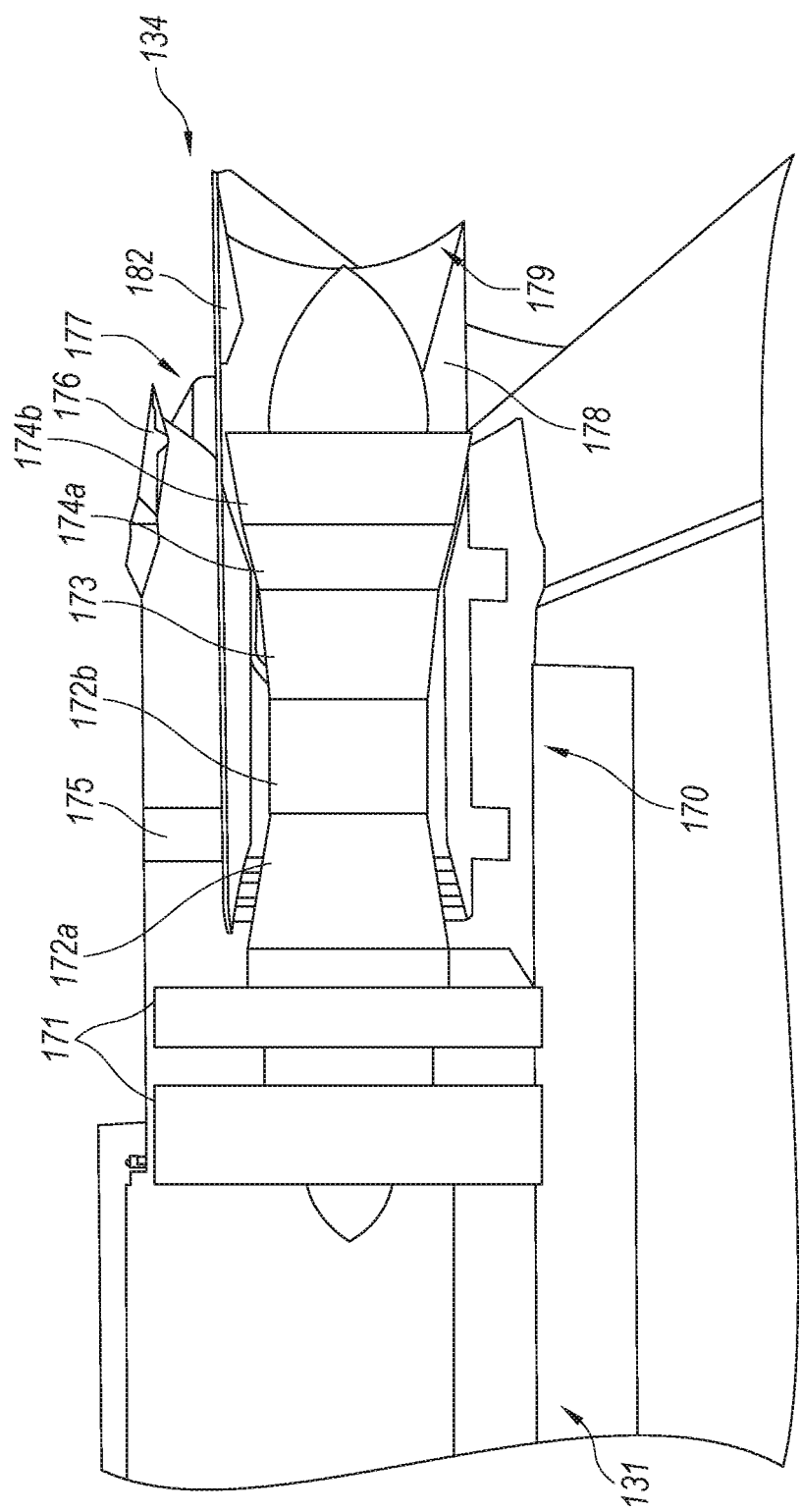
FIG. 4 is a partially schematic, cross-sectional illustration of the engine and nozzle portion of the propulsion system shown in FIG. 2.

FIG. 4 is a partially schematic illustration of the aft portion of the nacelle 131, including the engine 170 and nozzle 134. The engine 170 can be a variable-cycle engine, and can have a low bypass ratio turbofan configuration, with one or more fans 171 (two are shown in FIG. 4) that compress the flow entering the engine 170. A portion of the flow (e.g., a bypass flow or fan flow) is directed by the fan(s) through a fan flow duct 175. The remaining flow (e.g., a core flow) passes through one or more compressor stages 172, for example, multiple first compressor stages 172a and second compressor stages 172b. The first or low pressure compressor stages 172a can be mounted to an inner spool that also carries the fan(s) 171. The second compressor stages 172b (e.g., high pressure compressor stages) can be mounted to an outer spool mounted concentrically with the inner spool. After passing through the first compressor stages 172a and the second compressor stages 172b, the incoming air is mixed with fuel and combusted in a combustor 173. The resulting combustion products expand through one or more first turbine stages 174a, which are connected to the outer spool, and one or more second turbine stages 174b, which are connected to the inner spool. Accordingly, the first turbine stages 174a drive the second compressor stages 172b via the outer spool, and the second turbine stages 174b drive the first compressor stages 172a and the fans 170 via the inner spool.

The core flow exits the engine 170 via a core flow duct 178 and an associated core flow exit 179. The fan flow exits the fan flow duct 175 via a fan flow exit 177. The nozzle 134 can include corresponding convergent-divergent, variable area devices for both the core flow and the fan flow. In a particular embodiment, these devices can individually handle each of the foregoing flows. For example, the nozzle 134 can include one or more core flow ramps 182 that change the exit area and/or the throat area of the core flow duct 178. Accordingly, the nozzle 134 can expand the exhaust flow to supersonic velocities when the aircraft is flying at supersonic speeds, and to subsonic velocities when the aircraft is flying at subsonic speeds. Corresponding fan flow ramps 176 perform a similar function on the fan flow. Accordingly, the nozzle 134 can include two concentric, convergent/divergent, variable geometry devices that control the fan flow and the core flow, respectively. An advantage of this arrangement is that it can improve the overall efficiency of the propulsion system 130 and, in at least some cases, the noise signature of the nozzle, particularly at subsonic conditions. For example, the characteristics of the fan flow, which surrounds the core flow at and aft of the flow exits 177, 179, can be adjusted to provide noise suppression at particular flight conditions, and can be controlled separately from the core flow to optimize the noise suppression characteristics. In addition to or in lieu of the foregoing, the separable nozzle flows can improve flow stability, which in turn is expected to improve aircraft stability. In particular embodiments, the core and fan flows may be completely independent of each other. In other embodiments, the flows may be controlled separately (e.g., by different devices) but in a manner that is scheduled or otherwise interdependent. The control arrangement selected for a particular aircraft and/or flight regime can depend upon flight conditions, level of automation (or direct pilot control) and/or other suitable factors.

In some embodiments, the nozzle 134 can have arrangements other than individual variable area, convergent-divergent ducts for the fan flow and the core flow. For example in an embodiment in which the core and fan streams are mixed, a single variable convergent/divergent nozzle can be positioned downstream of the mixer.

4.0 Cabin Features

Figure 5:
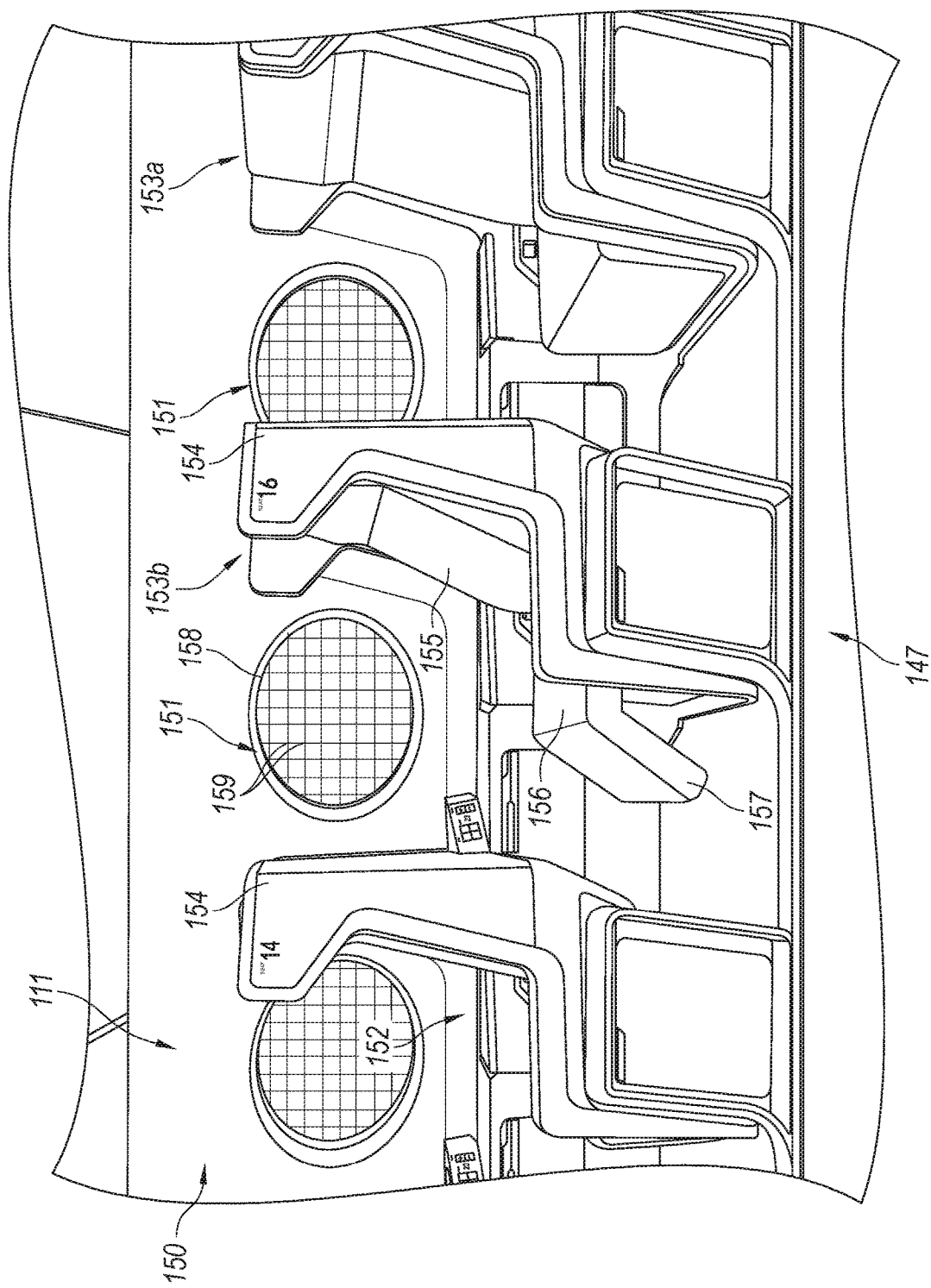
FIG. 5 is a partially schematic illustration of a portion of a supersonic aircraft cabin, configured in accordance with an embodiment of the present technology.

FIG. 5 is a partially schematic illustration of a representative passenger cabin 150, configured in accordance with an embodiment of the present technology. In one aspect of this embodiment, the cabin 150 includes a single aisle 147, with a single column of seats 152 on each side of the aisle 147. Each seat 152 can have a generally fixed shell 154 which houses multiple seat components. The seat components can be movable for passenger comfort, while the shell 154 remains in a fixed position. For example, the seat components can include a movable seat back 155, movable seat bottom 156, and movable leg rest 157. An advantage of the movable components in combination with the fixed shell 154 is that when one passenger reclines or otherwise adjusts his or her seat 152, it does not impinge on the space of the passenger behind. Accordingly, passengers can move individual seats 152, e.g., between an upright position 153a and a reclined position 153b without affecting other passengers. In the representative embodiment illustrated in FIG. 5, the seats 152 are shown as upright seats. As discussed above, some or all of the seats may have a lay-flat design, depending on the configuration requested by particular customers.

The cabin 150 can further include a fuselage wall 111 housing multiple windows 151. The windows 151 can have a relatively large size to allow passengers an expansive view. This may be particularly appealing because at the altitudes typically expected for supersonic cruise at Mach 2.2 (e.g., about 60,000 feet), passengers will be able to see the curvature of the Earth. A potential drawback with large windows, however, is that, in the event of a window failure, it may be difficult to control the pressure within the cabin, particularly during an engine-out condition. One approach for addressing this potential drawback is to outfit the window 151 with strengthening elements 158. For example, the strengthening elements 158 can include multiple filaments 159 embedded in the window 151 and arranged in a crossed, woven, or other suitable pattern as shown in FIG. 5. In particular embodiments, the filaments 159 can be clear so as to minimize the impact of the filaments 159 on the passengers' ability to view the exterior environment. In still further embodiments, the filaments 159 can be thin (e.g., several millimeters in diameter) to further reduce the interference with the passengers' field of view. Representative filament materials include carbon fiber, Kevlar, fiberglass, and/or other high-strength materials. Fiberglass (or other translucent or transparent materials may provide the additional advantage of further reducing interference with the passengers' views. For purposes of illustration, the thickness of the filaments 159 has been exaggerated in FIG. 5. In any of the foregoing embodiments, the window 151 can be installed so that if a particular window breaks, the entire window 151 does not fail and eject from the aircraft. Instead, only portions of the window fall away, thus reducing the rate at which pressurized air escapes the cabin 150. Accordingly, the cabin pressure can be more readily maintained in the event of a window failure.

Figure 6:
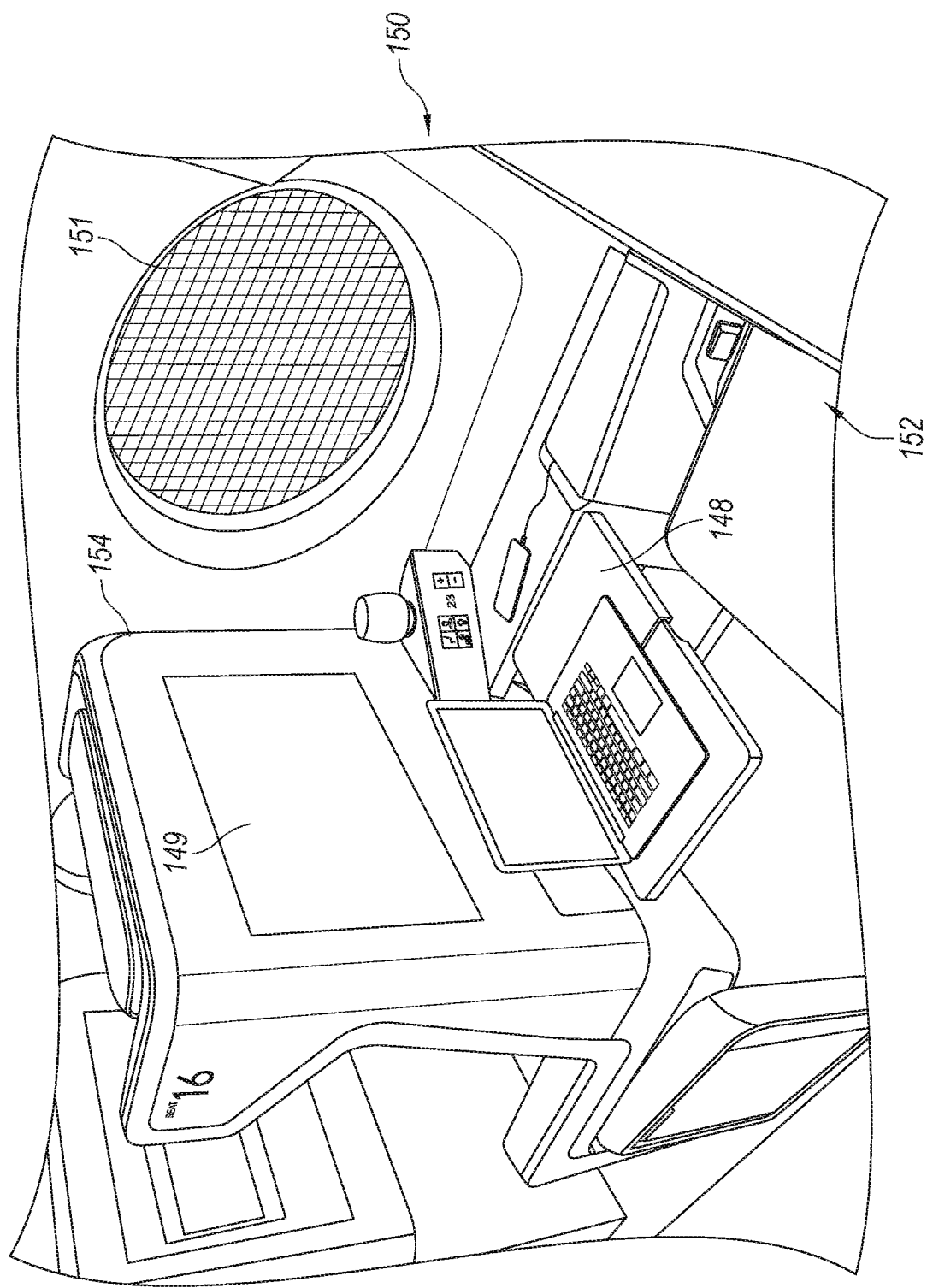
FIG. 6 is a partially schematic, enlarged isometric view of a portion of the cabin shown in FIG. 5.

FIG. 6 is a partially schematic illustration of a portion of the cabin 150 shown in FIG. 5, illustrating an entertainment screen 149 positioned on the rear of the shell 154 in front of a particular seat 152. FIG. 6 also illustrates a representative fold-out desk/table 148. The large size of the window 151 is further shown in FIG. 6.

Figure 7:
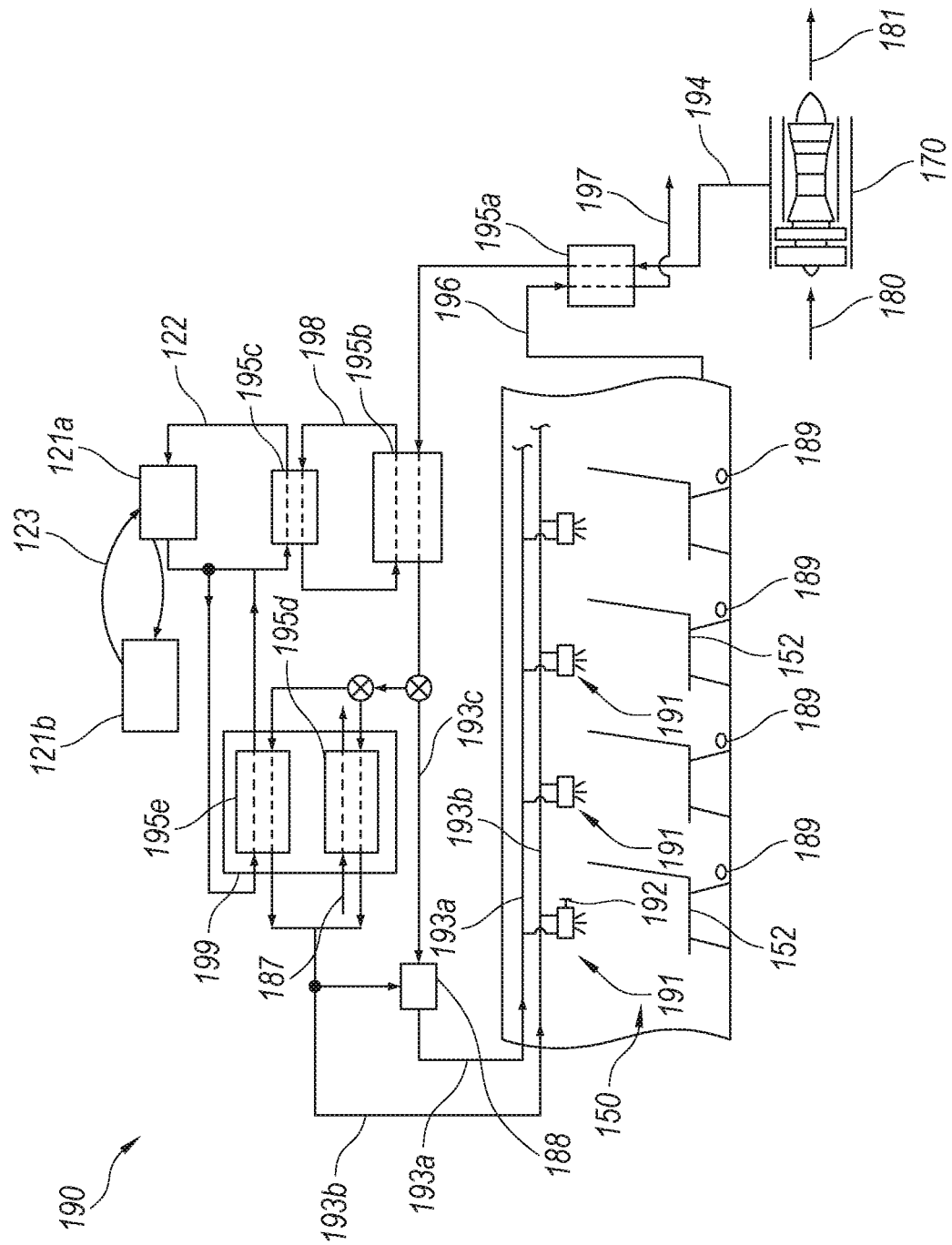
FIG. 7 is a partially schematic illustration of a cabin air system configured in accordance with an embodiment of the present technology.

FIG. 7 is a partially schematic illustration of a cabin air system 190 configured to provide an efficient flow of cabin air to the passengers in a manner that allows each passenger to individually control the temperature near his or her seat 152. Accordingly, the system 190 can include an individual air vent 191 at each seat 152. Each air vent 191 can be fed from both a warm air line 193a and a cold air line 193b. The air vent 191 can include a controller 192 (e.g., a mechanical or electromechanical device) that allows an individual passenger to control the temperature of air at a particular seat 152 without significantly impacting the air temperature at neighboring seats. This arrangement can increase the comfort for individual passengers, and can accommodate different temperature preferences among the passengers.

Pressurized air exiting the cabin 150 leaves through a cabin air exit duct 196. In a particular embodiment, the cabin air exit duct 196 receives air through individual apertures 189, aligned with corresponding individual seats 152. Accordingly, the combination of an individual air vent 191 and individual aperture 189 for each seat 152 can improve the ability of passengers to individually control the temperature at their seats without significantly affecting the temperature at other seats. Air exiting the cabin through the air exit duct 196 passes through a first heat exchanger 195a. The first heat exchanger 195a can have a counter-flow arrangement that allows the exiting cabin air to cool incoming air bleed air which is supplied to the cabin 150 via an engine bleed air duct 194. The engine bleed air duct 194 can direct a relatively small portion of the inlet air 180 passing through the engine 170 from the engine 170 to the cabin 150 without significantly impacting the flow of exhaust products 181.

The temperature of the engine bleed air is typically about 800° F., and can be cooled to approximately 500° F. via the exiting cabin air at the first heat exchanger 195a. After cooling the incoming engine bleed air, the cabin air exits the aircraft through a cabin air dump duct 197. The cooled engine bleed air passes to a second heat exchanger 195b where it is further cooled via thermal communication with the fuel carried onboard the aircraft. In particular embodiments, it may be undesirable to have direct thermal contact between the fuel and the air delivered to the cabin. Accordingly, the cabin air system 190 can include two heat exchanger circuits: a fuel coolant circuit 122 and a non-fuel coolant circuit 198, each in thermal (but not fluid) communication with the other. The fuel coolant circuit 122 receives chilled fuel from a fuel tank (e.g., the wing fuel tank 121a) and directs the fuel to a third heat exchanger 195c. At the third heat exchanger 195c, a non-fuel coolant (e.g., a non-flammable chemical refrigerant) gives up heat to the fuel and, after being chilled, receives heat from the engine bleed air at the second heat exchanger 195b. This in turn cools the engine bleed air further, e.g., to a temperature of about 320° F.

The engine bleed air can be further cooled via an air cycle machine 199 that operates in conjunction with two further heat exchangers, shown as a fourth heat exchanger 195d and a fifth heat exchanger 195e. During subsonic flight, air entering the air cycle machine 199 is directed to the fourth heat exchanger 195d, where it is cooled by external air 187. During supersonic flight (when the external air is too hot to provide a cooling function), the air entering the air cycle machine 199 is directed to the fifth heat exchanger 195e where it is cooled by the fuel. The cooling effect at the fifth heat exchanger 195e can be direct, e.g., via the fuel coolant circuit 122 (as shown in FIG. 7), or indirect, e.g., via the non-fuel coolant circuit 198. After passing through the air cycle machine 199, the cooled engine bleed air (e.g., at a temperature of from about 25° F. to about 60° F.) is provided to the cabin 150 via the cool air line 193b. A bypass line 193c provides hot air (e.g., at 320° F.) to a mixer 188, which mixes in cool air to provide warm air (e.g., 100° F.-120° F.) to the warm air line 193a. The passenger then adjusts the controller 192 at the air vent 191 to select the desired temperature.

One feature of the foregoing arrangement is that individual passengers can control the temperature of the air in their immediate vicinity with little or no impact on other passengers. This feature can significantly improve passenger comfort and satisfaction. Another feature of the foregoing arrangement is that the first heat exchanger improves the efficiency with which the engine bleed air is cooled before being delivered to the cabin. In particular, the cabin air is continually dumped overboard and replenished with new engine bleed air drawn from the engine 170. Before being dumped, the cabin air is used to cool the incoming engine bleed air, which reduces the cooling requirements on other elements of the cabin air system 190 by using air that would otherwise be dumped overboard without performing any further functions.

Another feature shown in FIG. 7 is a fuel ballast circuit 128, which can be used to transfer fuel between the wing-mounted fuel tank(s) 121a and one or more fuselage-mounted fuel tanks 121b. As discussed above, shifting fuel among the tanks can be used to improve the alignment of the aircraft center of gravity and the aircraft center of pressure.

5.0 Flight Deck Features

In a particular embodiment, the flight deck 160 shown in FIG. 1 can include a synthetic vision system to provide the pilots with sufficient visual awareness of the environment outside the aircraft, despite the pointed, high aspect ratio configuration of the aircraft nose 162 and windshield 161 (see FIG. 1). In a particular embodiment, the synthetic vision can be provided by multiple cameras positioned at different points of the aircraft 100 to obtain different views of the external environment. The information obtained from the cameras can be provided to the pilot on multiple screens positioned at the flight deck and/or via a virtual reality display, and/or via other suitable techniques. In any of these embodiments, the synthetic vision presented to the pilots can serve as the primary vision for the environment external to the aircraft for (a) all flight segments, or (b) selected flight segments (e.g., high angle of attack maneuvers, including climb-out and/or approaching landing. This is unlike typical synthetic vision systems, which generally provide a backup capability to the pilots' view of the environment through the flight deck windshield. An advantage of the synthetic vision system operating as the primary vision system is that it can provide the pilots with sufficient visual access to the outside, without requiring an articulating nose, and/or other complex and/or heavy mechanisms that have been used on conventional supersonic aircraft, for example, the Concorde. In some embodiments, the windshield can be eliminated entirely. In particular embodiments, the aircraft 100 can include multiple backup cameras and/or other redundancy arrangements in case of one or more system failures. The cameras can operate within the visible spectrum and/or can operate outside the visible spectrum. The system can include on-board, real-time processing that generates a false-color (or other rendered) image for improved forward visibility. One representative arrangement includes a pilot procedure in which the aircraft (a) flies the final approach at a high crab angle (allowing the pilot visual access through a side window) followed by (b) straightening the aircraft out just before touchdown.

Figure 8:
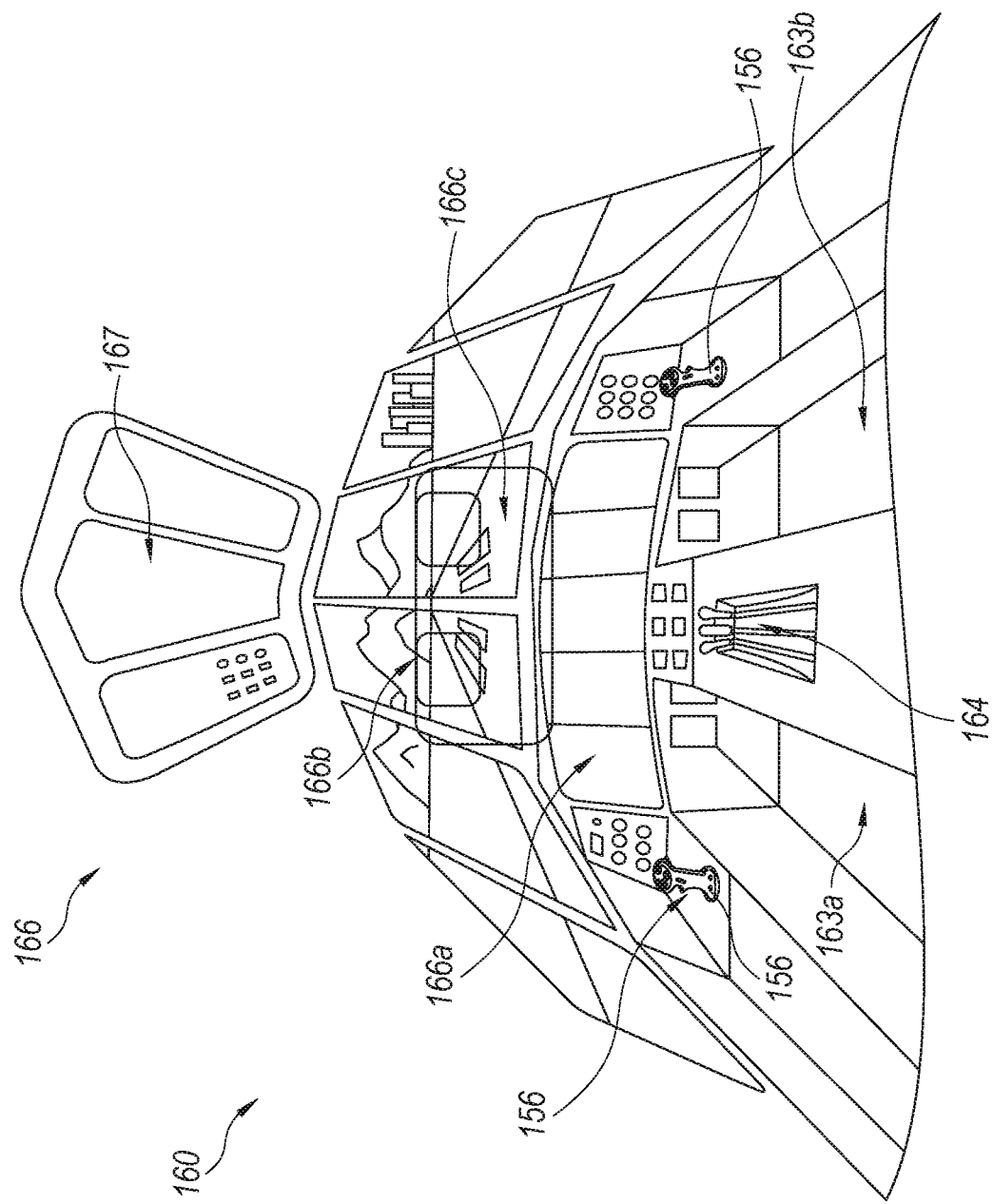
FIG. 8 is a partially schematic illustration of a supersonic aircraft flight deck configured in accordance with an embodiment of the present technology.

FIG. 8 is a partially schematic, isometric illustration of a representative flight deck 160 configured in accordance with an embodiment of the present technology. The flight deck includes crew seats 163, including a pilot seat 163a and a first officer seat 163b. The pilot and first officer each have access to a corresponding side stick 156 to control the aircraft flight direction. The side stick 156 can operate as a joystick during flight, and can be twisted for steering on the ground, and can be connected both digitally and mechanically, so that if one side stick 156 is moved, the other moves correspondingly. The flight deck 160 can further include a digital throttle and inlet control 164, e.g., with a single lever per engine. An overhead panel 167 can include additional control input and output elements. The flight deck 160 is further outfitted with one or more displays 166, for example, five large flat panel touch displays 166a positioned beneath a heads up display 166b, which can support a pop up display 166c. In a particular embodiment, the pop up display 166c presents a synthetic vision image via inputs from the cameras describe above, and in a particular embodiment, the image presented to the flight deck crew can be augmented with augmented reality glasses. Accordingly, as discussed above, the flight crew can receive a full complement of visual cues for flying the aircraft during any phase of its operation, despite limited direct visual access to the external environment.

6.0 Flight Planning

One expected advantage of aircraft having any of the representative configurations described above is that they can significantly reduce the travel time on transoceanic routes. For example, a representative supersonic aircraft flying at Mach 2.2 in accordance with embodiments of the present technology can cut the transatlantic travel time from six hours to about three hours. Accordingly, a business traveler can travel from the U.S. to Europe for an afternoon meeting and return to the U.S. the same day. On trans-Pacific routes (on which the aircraft may make a fueling stop), a business trip may be conducted in a total of two days rather than three days.

Other flight routes may include overland segments, depending, for example, on local regulations. For example, current U.S. FAA regulations prohibit overland flight at supersonic Mach numbers, while travel over other countries may not be as restricted. In addition, wind conditions may vary significantly with altitude and can therefore significantly affect the time it takes to conduct a particular trip.

A representative method and associated computer-based system can automatically determine flight routes, including overland segments, over-ocean segments, multi-altitude segments, and/or other variables that produce the shortest travel time between two points. This approach can be used for general route planning, and/or on a flight-by-flight basis to make best use of conditions that change from one flight to another and/or during the course of a particular flight.

Figure 9:
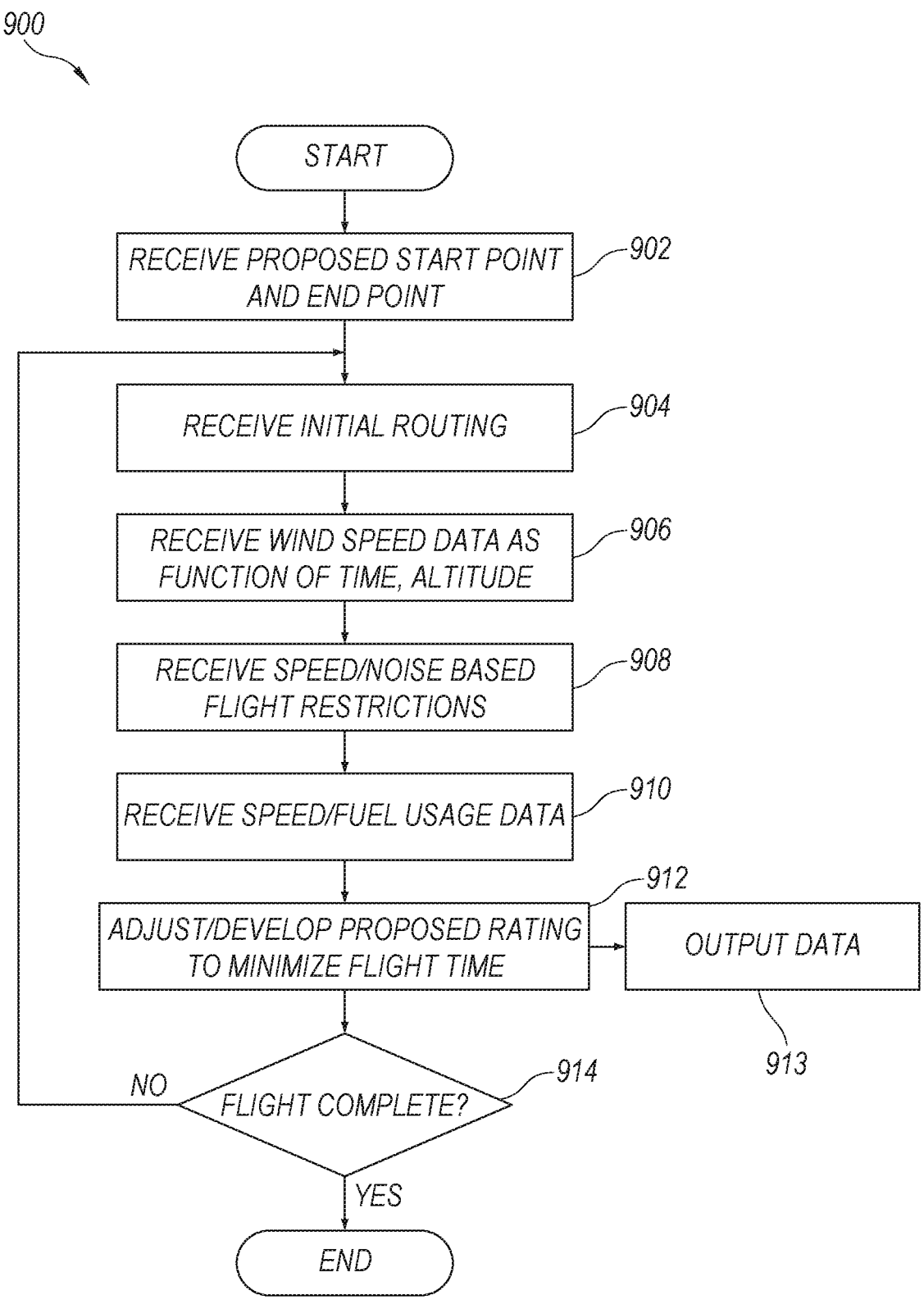
FIG. 9 illustrates a flight planning algorithm for supersonic commercial flights, configured in accordance with an embodiment of the present technology.

FIG. 9 is a flow diagram illustrating a representative process 900 for flight planning in accordance with embodiments of the present technology. Process portion 902 includes receiving a proposed starting point and ending point for the flight. Representative flights can include transatlantic routes (e.g., New York to London), transpacific routes (e.g., Los Angeles to Tokyo), and/or routes that include an overland segment (e.g., London to Seattle or San Francisco to Bangkok). Process portion 904 includes receiving an initial routing. In a particular embodiment, the initial routing is based on prior routing information for similar city pairs. In other embodiments, the initial routing can be optional, and the process 900 can instead include developing a routing from scratch without an initial routing.

Process portions 906-910 include receiving further input information. For example, process portion 906 can include receiving wind speed data as a function of time, altitude, and/or other variables. The data can be based on present or relatively current measurements (e.g., from other aircraft that are flying or have recently flown the route) and/or prediction data. Process portion 908 can include receiving data corresponding to speed and/or noise-based flight restrictions. For example, the information received at process portion 908 can include local noise limit regulations that may restrict supersonic flight, regulations that prohibit supersonic flight, and/or information corresponding to corridors or other particular flight paths that may permit supersonic overflight. Process portion 910 includes receiving speed and fuel usage data, for example, based on predictions and/or past flights.

In process portion 912, the foregoing data are evaluated, for example, using a suitable iterative algorithm. Process portion 913 includes outputting the resulting data, for example, in the form of a proposed or adjusted routing or flight path. This information can be used by pilots when flying en route, and/or other operations personnel when planning for a new flight to be carried out. In process portion 914, the process includes determining whether the flight is complete or not. If the flight is complete, the process ends. If the flight has not been completed, the process returns to block 904 to continue determining and proposing options for flight path adjustments.

As described above, one goal of the route planning process (e.g., implemented via software) is to find the shortest-time route under a variety of constraints. These constraints can include: unrestricted supersonic flight over water, certain land corridors for supersonic flight, and flight over unpopulated polar regions. Some overland areas may allow only subsonic flight while others may allow low supersonic flight (e.g., at Mach 1.15). Additionally, the range of the aircraft is limited, so the route planning software is programmed to choose a selected (e.g., optimal) refuel stop location if needed. Still further, winds (including historical averages or current forecasted winds) can be taken into account to pick the shortest time flights.

A representative algorithm proceeds as follows. First, the great circle (GC) distance between origin and destination is calculated. If the GC distance exceeds the range of the airplane, a subroutine is invoked to calculate candidate tech stops (e.g., refuel stops). The tech stop selector reviews all possible tech stops and selects the top candidate stops (e.g., the top five) which would result in the lowest origin-stop-destination distance, when flown on great circle routing. The origin-stop and stop-destination segments are separately optimized (according to the algorithm below), and the stop with the minimum overall flight time plus stop time is selected.

To optimize a given segment (origin-destination, origin-stop, or stop-destination), e.g., a heuristic search algorithm based on A* can be used. In a representative embodiment, the globe is discretized into a set of possible latitude/ longitude points. For performance reasons, a smaller number of points can be used, such as rounding to whole degrees. Starting at the origin, the A* algorithm proceeds with a breadth-first search toward the destination, with heuristic prioritization of paths with lower great circle distance to the destination. The cost of each edge in the search graph is its flight time e.g., calculated based on the maximum speed in that geographic location and wind data at the appropriate altitude, with a time penalty added for transitions between subsonic and supersonic flight. Additionally, the algorithm keeps track of the total distance flown since the origination of the flight, and aborts the search through a given node if the distance exceeds the range of the airplane.

Throughout the search process (or in a post-processing step), adjacent nodes on the selected flight plan are coalesced, if the path can be more quickly flown on a great circle route rather than through discrete latitude longitude points. For example, if the algorithm determines that the best path is A-B-C, the process includes then checking whether flying directly (along a great circle route) from A to C would be faster. If so, B is removed from the selected flight route.

The output can be a series of nodes from origin to destination (possibly with one or more intermediate tech stops) between the nodes it is expected that the airplane will fly on great circle routes.

7.0 Further Embodiments

In other embodiments, supersonic commercial aircraft providing some or all of the functions described above with reference to FIGS. 1-9 can have configurations other than those described above. For example, FIGS. 10A-10D illustrate a representative supersonic commercial aircraft 1000 that is also configured for cruise operation at Mach 2.2, but has a different propulsion system than that described above. In one aspect of this embodiment, the configuration shown in FIGS. 10A-10D can be used for a demonstrator aircraft, e.g., a subscale aircraft used primarily for testing purposes. In other embodiments, the configuration can be used for a full size commercial supersonic transport. In any of these embodiments, the aircraft 1000 can include a fuselage 1010, a swept delta wing 1020 and associated chine 1024, a vertical stabilizer 1001, and a propulsion system 1030. The propulsion system 1030 can include two nacelles 1031 with corresponding inlets 1032 that together provide inlet air for three engines 1070, shown as a first engine 1070a and a second engine 1070b (each carried by one of the wings 1020), and a third engine 1070c carried by the fuselage 1010.

Figure 11:
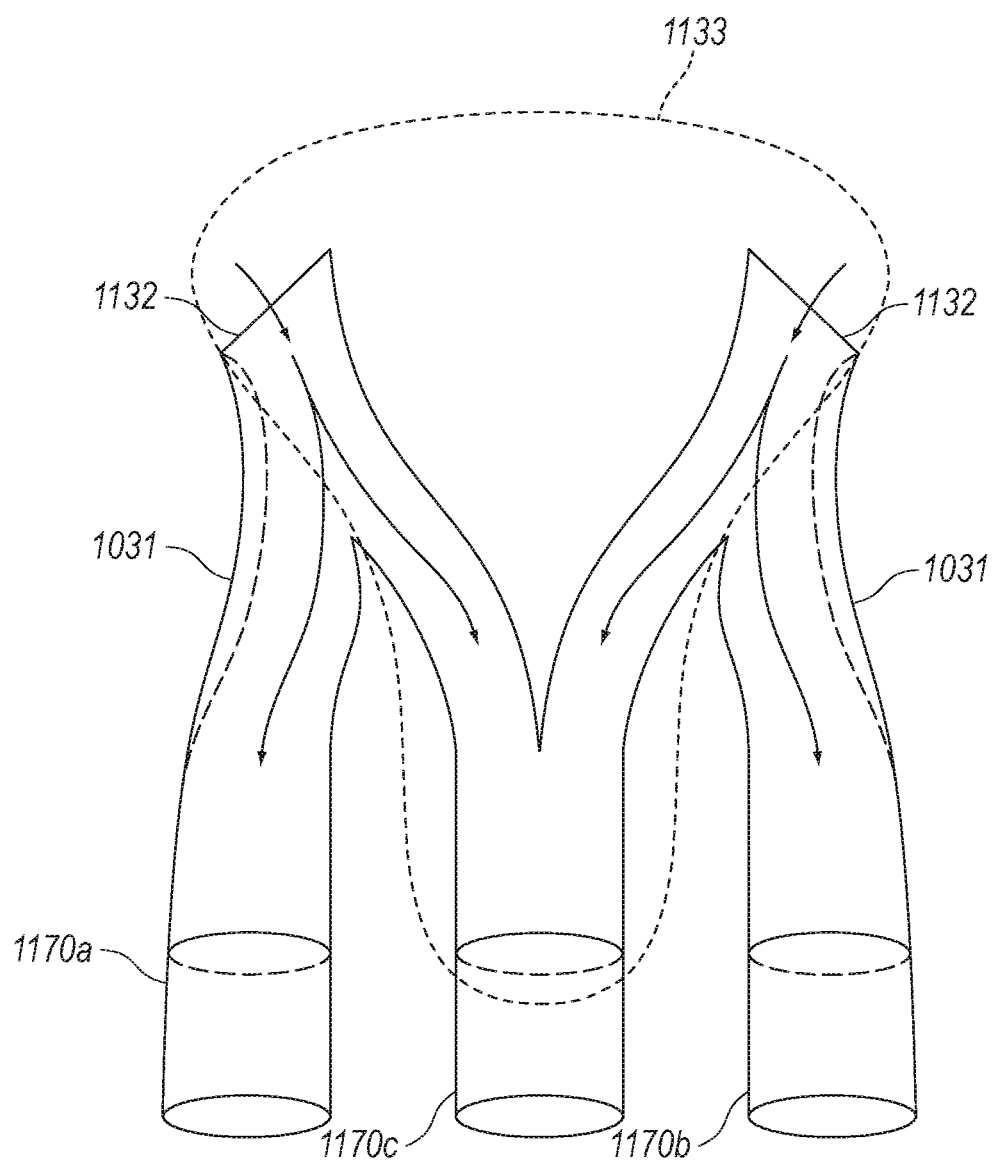
FIG. 11 is a partially schematic illustration of a supersonic inlet system configured in accordance with another embodiment of the present technology.

FIG. 11 schematically illustrates an arrangement by which the two nacelles 1031 deliver air to the three engines 1070a, 1070b and 1070c. In particular, each nacelle 1032 can include a bifurcated inlet duct that delivers a portion of air to one of the wing-mounted engines 1070a, 1070b and another portion of air to the third fuselage-mounted engine 1070c. In a particular aspect of this embodiment, the bifurcated ducts, which rejoin prior to the engine face of the third engine 1070c, can be used to test and refine the bifurcated duct arrangement shown and described above with reference to FIG. 1. A dashed line envelope 1133 identifies the portion of the overall inlet system that can be used to simulate the bifurcated duct arrangement shown and described above with reference to FIG. 1.

Figure 12:
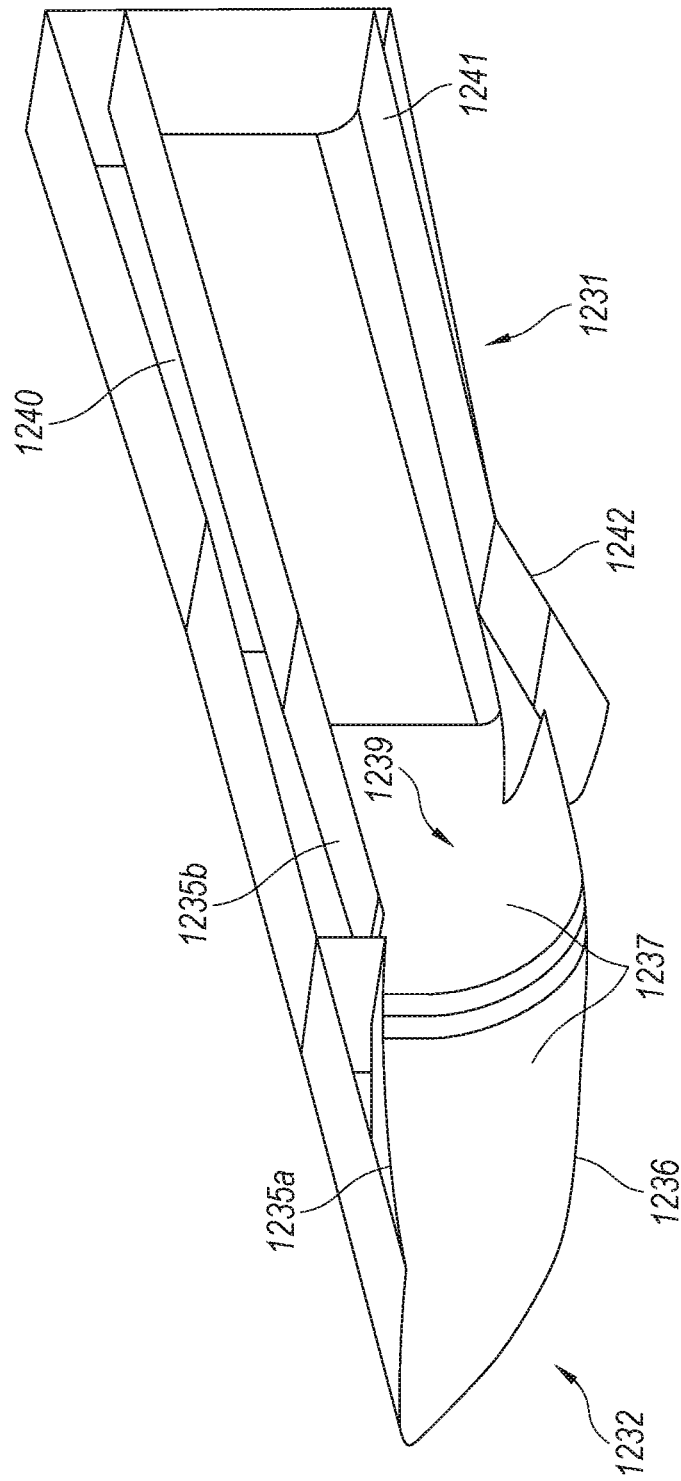
FIG. 12 is a partially schematic, cut-away isometric view of an inlet having a three-dimensional geometry in accordance with an embodiment of the present technology.

In particular embodiments described above, the engine inlets can have a two-dimensional configuration, for example, with a rectangular or generally rectangular cross-sectional flow area. In other embodiments, the engine inlets can have a three-dimensional design. For example, as shown in FIG. 12, a representative nacelle 1231 includes an inlet 1232 with an inlet aperture 1236 having a generally D-shaped configuration, without a clear plane of symmetry, unlike the inlets described above. The inlet 1232 can include movable sidewalls 1237, a moveable forward ramp 1235a and a moveable aft ramp 1235b that control the flow entering and passing through the corresponding throat region 1239. A bypass duct 1240 directs a portion of the inlet air around the corresponding diffuser 1241, e.g., for engine cooling and/or cabin air. In a particular aspect of this embodiment, the inlet 1232 includes a moveable speed door 1242 that can open (as shown in FIG. 12) to capture additional air during subsonic operations, and close during supersonic operations.

An advantage of the three-dimensional geometry described above with reference to FIG. 12 is that it can be more readily integrated with the overall airframe and can therefore reduce the wave drag of the aircraft. A challenge with this design is that it requires a changeable geometry that operates in a three-dimensional configuration. An approach to addressing this challenge is to include ramps (discussed above) that operate in a three-dimensional inlet aperture, and/or other surfaces (e.g., flexible surfaces) that provide for variable compression schedules despite the three-dimensional inlet shape.

Supersonic commercial aircraft in accordance with some embodiments of the present technology can include a fuselage configured to carry a crew and a maximum of from 20 to 60 passengers in some embodiments, (or up to 100 passengers in some embodiments), a delta wing connected to the fuselage, and a propulsion system carried by at least one of the wing and the fuselage. The propulsion system can include a plurality of engines, at least one variable-geometry inlet, and at least one variable-geometry nozzle.

In some embodiments, the fuselage carries a flight deck with a synthetic vision system providing primary visual access to an environment outside the aircraft for at least one flight segment (e.g., the approach/landing, and/or climate-out segments), or for all flight segments. In at least some embodiments, this arrangement can enable the flight deck to have a fixed position relative to the fuselage.

The propulsion system can include a fan flow duct and a core flow duct, and the variable-geometry nozzle can include a first variable area device positioned to control fan flow through the fan flow duct, and a second variable area device positioned to control a flow of exhaust products through the core flow duct. The first and second variable area devices can be separately controllable, e.g., to separately control inlet and exhaust flow associated with the propulsion engine. The propulsion system can include two engines (e.g., a maximum of two engines), or three engines (e.g., a maximum of three engines). In some embodiments, the variable-geometry inlet can include a bifurcated inlet duct that provides air to one of the engines via a first portion, and to another of the engines via a second portion.

The fuselage can include a plurality of passenger seats, e.g., for revenue-generating passengers, with an individual seat including a fixed shell and a movable seat back positioned at least partially in, and moveable relative to, the fixed shell. Whether or not the seats include the foregoing arrangement, the seats can include corresponding air vents having corresponding individual air temperature controls. For example, each air vent can be supplied with air from a first duct configured to carry air at a first temperature, and a second duct configured to carry air at a second temperature different than the first. Individual air exit ducts can collect air for the corresponding individual seats, and in particular embodiments, can be directed to a heat exchanger to transfer heat from air dumped overboard the aircraft to engine bleed air directed from the engine to the aircraft cabin.

The present technology includes methods of manufacture and methods of use associated with any of the features described herein. For example, methods in accordance with embodiments of the present technology include flying a commercial supersonic aircraft having a crew and a maximum passenger capacity of from 40 to 50 passengers. Representative methods can include controlling fan flow received from an engine of the aircraft via a first variable area convergent-divergent duct, and controlling core flow received from the engine via a second variable area convergent-divergent duct.

Further representative methods in accordance with the present technology include flying the aircraft via a synthetic vision display that operates as the primary flight crew display during one or more flight segments of the aircraft, e.g., approach and landing, and/or climb-out.

Further representative methods include moving a seat back of the individual passenger seat without constraining the space in front of the seat immediately behind it, individually controlling the temperature of air at a particular passenger seat via a controller, and/or, and/or cooling (e.g., via a heat exchanger) engine bleed air supplied to a passenger seat region with air collected from a passenger seat region.

From the foregoing, it will be appreciated that specific embodiments of the present technology have been described herein for purposes of illustration, but that various modifications may be made without deviating from the technology. For example, in some embodiments, the aircraft can have a twinjet rather than a trijet configuration, as discussed above. In some embodiments, the aircraft can carry more or fewer than 45 passengers. In a particular embodiment the aircraft carries between 40 and 50 passengers (maximum capacity), but in other embodiments, the aircraft can carry greater numbers of passengers, e.g., up to 100 passengers. In one such embodiment, the aircraft has a twinjet configuration, a range of 6000 nautical miles, and/or sonic boom shaping (e.g., external surfaces shaped specifically to reduce or eliminate sonic booms during supersonic flight). In any of these embodiments, the general aspects of the aircraft can be similar to those described above so as to produce the operational efficiencies described above. The aircraft can be configured for supersonic cruise at suitable Mach numbers other than 2.2, e.g., Mach 2.5 or other Mach numbers greater than Mach 2.2, or at suitable Mach numbers less than Mach 2.2.

Certain aspects of the technology described in the context of particular embodiments may be combined or eliminated in other embodiments. For example, certain aircraft may include the overall configuration and propulsion system described above, without the interior cabin arrangement, cabin air arrangement, and/or a synthetic vision arrangement described above. Further, while advantages associated with certain embodiments of the technology have been described in the context of those embodiments, other embodiments may also exhibit such advantages, and not all embodiments need necessarily exhibit such advantages to fall within the scope of the present technology. Accordingly, the present disclosure and associates technology can encompass other embodiments not expressly shown or described herein.

To the extent any materials incorporated herein by reference conflict with the present disclosure, the present disclosure controls. The use of the phrase "and/or," as in "A and/or B," refers to A alone or B alone or both A and B.

We claim:

1. A non-transitory computer-readable medium having instructions that, when executed: receive a first input corresponding to a departure location and an arrival location for a supersonic aircraft flight; receive a second input corresponding to wind speed information, including wind speeds as a function of time and altitude; receive a third input corresponding to speed/noise restriction information, including restrictions for supersonic overland flight; receive a fourth input corresponding to speed/fuel usage information for a supersonic aircraft; and based at least on the first, second, third and fourth inputs, determine a route between the departure location and the arrival location, with the route deviating from a great circle route, by seeking a minimum flight time for a flight conforming to the first, second, third and fourth inputs.

2. The non-transitory computer-readable medium of claim 1 wherein the instructions, when executed, track flight times for both supersonic and subsonic legs of the flight.

3. The non-transitory computer-readable medium of claim 1 wherein the instructions, when executed, modify an existing route of an in-flight aircraft.

4. The non-transitory computer-readable medium of claim 1 wherein the process of determining a route includes an iterative process.

5. The non-transitory computer-readable medium of claim 1 wherein determining a route includes determining a route that includes at least one refueling stop.

6. The non-transitory computer-readable medium of claim 1 wherein determining a route includes determining a route that includes an overwater cruise segment at a first supersonic Mach number and an overland cruise segment at a second supersonic Mach number less than the first.

7. A computer-based system having instructions that, when executed: receive inputs corresponding to: a departure location for a supersonic aircraft flight; an arrival location for the supersonic aircraft flight; wind speed information, including wind speeds as a function of time and altitude; at least one of speed restriction information or noise-based restriction information, including a restriction for supersonic overland flight; and speed information and fuel usage information for a supersonic aircraft; and based at least on the inputs, determine a route between the departure location and the arrival location, with the route deviating from a great circle route, by seeking a minimum flight time for a flight conforming to the first, second, third and fourth inputs.

8. The system of claim 7 wherein the instructions, when executed, track flight times for both supersonic and subsonic legs of the flight.

9. The system of claim 7 wherein the instructions, when executed, modify an existing route of an in-flight aircraft.

10. The system of claim 7 wherein determining a route includes an iterative process.

11. The system of claim 7 wherein determining a route includes determining a route that includes at least one refueling stop.

12. The system of claim 7 wherein determining a route includes determining a route that includes an overwater cruise segment at a first supersonic Mach number and an overland cruise segment at a second supersonic Mach number less than the first.

13. A method for determining a route for a supersonic aircraft, comprising: receiving inputs corresponding to: a departure location for a supersonic aircraft flight; an arrival location for the supersonic aircraft flight; wind speed information, including wind speeds as a function of time and altitude; at least one of speed restriction information or noise-based restriction information, including a restriction for supersonic overland flight; and speed information and fuel usage information for a supersonic aircraft; and based at least on the inputs, determine a route between the departure location and the arrival location, with the route deviating from a great circle route, by seeking a minimum flight time for a flight conforming to the first, second, third and fourth inputs.

14. The method of claim 13, further comprising tracking flight times for both supersonic and subsonic legs of the flight.

15. The method of claim 13, further comprising modifying an existing route of an in-flight aircraft.

16. The method of claim 13 wherein determining a route includes an iterative process.

17. The method of claim 13 wherein determining a route includes determining a route that includes at least one refueling stop.

18. The method of claim 13 wherein determining a route includes determining a route that includes an overwater cruise segment at a first supersonic Mach number and an overland cruise segment at a second supersonic Mach number less than the first.

19. The method of claim 13 wherein determining a route is performed once for multiple flights.

20. The method of claim 13 wherein determining a route is performed on a flight-by-flight basis.

21. The method of claim 13 wherein determining a route is performed by determining at least one great circle route segment.

* * * * *